(12) United States Patent
Gupta et al.

(10) Patent No.: US 11,276,153 B2
(45) Date of Patent: Mar. 15, 2022

(54) AUTO-COMPLETE IMAGE SUGGESTIONS FOR IMAGE EDITING

(71) Applicant: ADOBE INC., San Jose, CA (US)

(72) Inventors: Subham Gupta, Uttarakhand (IN); Anuradha, Karnataka (IN); Arnab Sil, West Bengal (IN); Shatrunjay Pathare, Maharashtra (IN); Mustansir Bartanwala, Maharashtra (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/742,815

(22) Filed: Jan. 14, 2020

(65) Prior Publication Data
US 2021/0217152 A1    Jul. 15, 2021

(51) Int. Cl.
    *G06T 5/50*    (2006.01)
    *G06T 17/05*   (2011.01)
    *G06T 5/40*    (2006.01)

(52) U.S. Cl.
    CPC .................. *G06T 5/50* (2013.01); *G06T 5/40* (2013.01); *G06T 17/05* (2013.01)

(58) Field of Classification Search
CPC . G06T 5/50; G06T 5/40; G06T 11/001; G06T 15/04; G06T 15/005; G06T 11/60; G06T 19/00; G06T 11/00; G09G 5/363; G06F 9/44458; G06F 3/0481
See application file for complete search history.

(56) References Cited

U.S. PATENT DOCUMENTS

| 5,687,332 | A | * | 11/1997 | Kurahashi | G06T 11/60 |
| | | | | | 715/706 |
| 2009/0003702 | A1 | * | 1/2009 | Ofek | G06T 11/001 |
| | | | | | 382/181 |
| 2011/0026901 | A1 | * | 2/2011 | Kashima | G06F 3/0482 |
| | | | | | 386/282 |
| 2013/0173603 | A1 | * | 7/2013 | Hamilton | G06F 16/51 |
| | | | | | 707/723 |
| 2017/0076145 | A1 | * | 3/2017 | Gottemukkula | G06K 9/4642 |
| 2019/0012717 | A1 | * | 1/2019 | Han | G06T 19/006 |

OTHER PUBLICATIONS

Adobe PS Express; Nov. 2016 (Year: 2016).*

* cited by examiner

*Primary Examiner* — Todd Buttram
(74) *Attorney, Agent, or Firm* — Shook, Hardy & Bacon LLP

(57) ABSTRACT

Methods and systems are provided for generating auto-complete image suggestions. In embodiments described herein, a user image having an edit state is obtained. An edit state can indicate any edits applied by the user to the user image. For the user image, an auto-complete image suggestion is generated. The auto-complete image suggestion includes a representation of the user image with the user-applied edits as well as a set of supplemental edits. Such supplemental edits can be determined from a pre-edited image identified as similar to the user image.

20 Claims, 13 Drawing Sheets

LOOKUP IMAGE-EDITING INDEX 400

| IMAGE-ID 420 | EDIT-STATE ($X_i$) 422 | ADAPTIVE-HISTOGRAM DESCRIPTOR ($H_i$) 424 |
|---|---|---|
| IMG-A | [1, 0, 1, 1, 0, ........, 1] | [0.089, 0.413, 0.548, 0.327, ........, 0.117] |
| IMG-B | [1, 0, 0, 1, 0, ........, 0] | [0.143, 0.876, 0.548, 0.723, ........, 0.106] |
| ... | ... 428 | ... |
| IMG-A 426 | [0, 0, 1, 1, 0, ........, 1] | [0.275, 0.506, 0.432, 0.987, ........, 0.134] |

KEY 430 — 436 — 434

VALUE 432

AUTO-COMPLETE IMAGE SUGGESTIONS FOR IMAGE EDITING

BACKGROUND

Users often desire to adjust various aspects of an image to create a desired image. For example, a user may desire to modify contrast or exposure in an image. Typically, when multiple aspects are modified, such a manual process is tedious and time consuming as one aspect is modified and evaluated before a next aspect is modified and evaluated. This process can continue until a desired image is achieved. Moreover, in many cases, a user is unsure how to best edit an image further resulting in an inefficient process to achieve desired edits.

Users, however, generally prefer to edit images in an efficient and aesthetically pleasing manner. As such, some conventional systems have been developed to automate image adjustments or corrections. Such conventional systems, however, use saved edit settings or presets (e.g., slider settings) that can be applied to an image. However, the saved edit settings are a constant set of edit settings that remain the same for any image and override any edits applied to an image by a user.

SUMMARY

Accordingly, embodiments of the present disclosure are directed to facilitating generation of auto-complete image suggestions. An auto-complete image suggestion refers to a suggested image including a set of edits applied to a user image. Based on the user image, a set of one or more auto-complete image suggestions can be identified and presented to a user. Generally, the auto-complete image suggestion attempts to predict edits to apply to a current user image. In this regard, possible edits to apply to a user image can be identified and applied to the user image to render an automatically adjusted image suggestion.

To identify possible edits to apply to a user image, an image-editing index having edit states can be generated. Upon generating an image-editing index, the image-editing index can be used to identify suitable auto-complete suggestions for a given image (user image). To this end, given an image and the corresponding current edit settings, the index can be used to identify edit settings that are suited to be applied to the user image. In particular, to facilitate generation of an image suggestion(s) for a particular image (e.g., selected or input by a user), a similar image(s) referenced in the image-editing index can be identified. Similar images can be identified using adaptive-histogram descriptors. Utilizing an adaptive-histogram based descriptor (a set of histograms corresponding with various partitions of an image), as opposed to a histogram representing the entire image, enables capturing of spatial or localized color information of the image. By identifying similar images in the image-editing index, edits applied to such similar images can be identified and applied to the current image to generate an image suggestion.

Advantageously, auto-complete image suggestions are adaptive to the image content. As such, if the same set of edits are applied on two different images, the auto-complete suggestions will likely be different for the two different images. Further, the auto-complete image suggestions enable user applied settings to be maintained. That is, in accordance with embodiments described herein, auto-complete image suggestions do not override user applied image edits.

BRIEF DESCRIPTION OF THE DRAWINGS

FIG. 4 illustrates an example image-editing index, in accordance with embodiments of the present invention.

DETAILED DESCRIPTION

Figure 1:
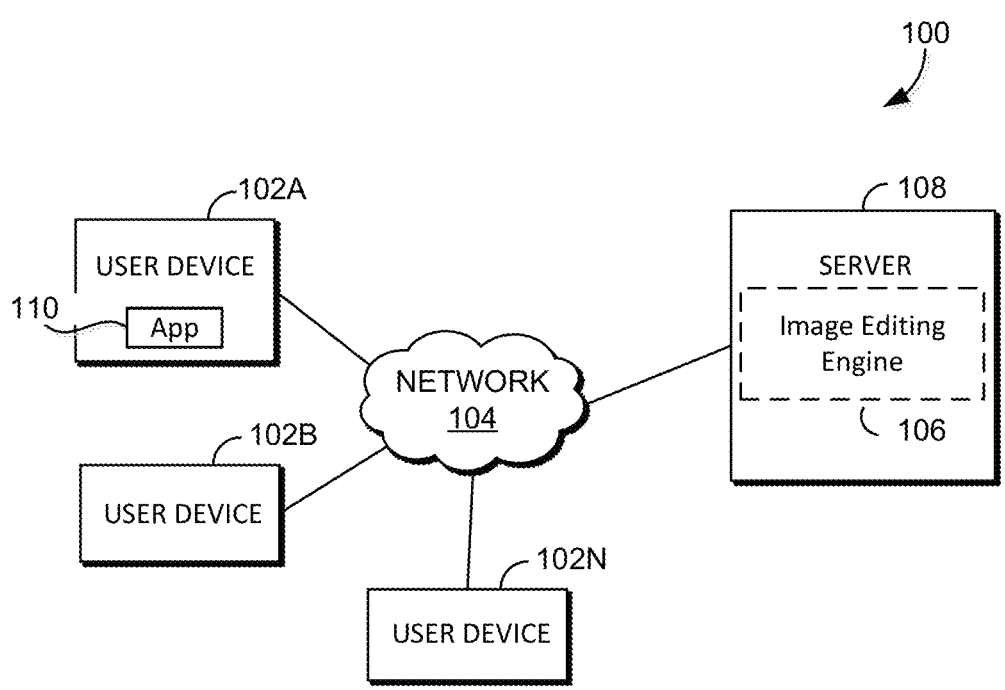
FIG. 1 depicts a diagram of an environment in which one or more embodiments of the present disclosure can be practiced, in accordance with various embodiments of the present disclosure.

Adjusting or correcting a digital image, for example, to adjust contrast, exposure, etc., can be time intensive. For instance, an image editor may initially adjust one aspect of the image (e.g., contrast). The adjusted image can then be viewed and analyzed by the image editor to identify another aspect of the image to adjust (e.g., exposure). This manual image adjusting process can continue until a desired image is achieved. As numerous aspects can be adjusted in an image, such a process can be tedious and inefficient.

Some conventional systems have been developed to automate image adjustments or corrections. In particular, some conventional systems use saved edit settings or presets (e.g., slider settings) that can be applied to an image. Such saved edit settings can be applied to various images. However, the saved edit settings are a constant set of edit settings that remain the same for any image. As such, while the saved edit settings might be suitable for one image, they may not be suitable for another image. In some cases, depending on the image to which the edits are to apply, using the saved edit settings to edit the image may even result in a reduced image quality. Further, in some cases, third-parties may develop presets resulting in an extensive amount of presets available for image editing. Due to the extensive amount of available presets, it can be tedious for a user to identify a preset from among the numerous options that is best for their image.

Moreover, using a preset, or a set of saved edit settings, can result in overriding of edits manually applied by an editor. For example, assume a user makes edits to an image. Now assume a user reviews various available presets. By applying one of the available presets, the edits previously made to the image by the user are overridden with the settings of the selected preset. As such, a user may avoid using a preset if the user already applied edits to an image.

Accordingly, embodiments of the present disclosure are directed to facilitating generation of auto-complete image suggestions. An auto-complete image suggestion refers to a suggested image including a set of edits applied to a user image. Based on the user image, a set of one or more auto-complete image suggestions can be identified and presented to a user. Generally, the auto-complete image suggestion attempts to predict edits to apply to a current user image. In this regard, possible edits to apply to a user image can be identified and applied to the user image to render an automatically adjusted image suggestion.

In operation, auto-complete image suggestions for a user image are identified using final edit settings associated with images deemed similar to the user image. In particular, a current edit state of a user image can be compared to edit states of pre-edited images (e.g., edited by a professional editor) referenced in an image-editing index. An edit state generally refers to a state of edits of an image and may indicate, for example, whether edits associated with various edit controls have been applied to the image. For images having edit states with a same or substantially similar to the edit state of a user image, image representations are compared to determine similarity. In embodiments, image representations in the form of adaptive-histogram descriptors can be compared to identify images deemed similar to the user image. An adaptive-histogram descriptor refers to a description of a histogram representing a distribution of a feature (e.g., colors) for various partitions or portions of an image. As such, an adaptive-histogram descriptor adapts to or corresponds with various portions of an image. For image representations in the image-editing index deemed similar to an image representation of the user image, a corresponding set of final edit settings applied to the candidate, pre-edited image can be obtained.

In embodiments, such final edit settings applied to the pre-edited image deemed similar to the user image can be used to identify a suitable set of edits to apply to the user image. As can be appreciated, edits applied by a user to a user image are often desired to be maintained. For example, a user may increase exposure of an image and desire to maintain the adjusted exposure. To this end, the edit values of the final edit settings of the pre-edited image (e.g., via the professional editor) may be overridden for the fields associated with edit controls modified by user. Stated differently, final edit settings associated with a candidate image can be overridden with user edit values, where applicable. As such, any applicable user edited settings may replace or override a corresponding setting of the final edit settings to arrive at a set of updated suitable edit settings for use in generating an image suggestion. The edit settings identified as suitable to can be applied to a user image to generate an auto-complete image suggestion.

Turning to FIG. 1, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that operating environment 100 shown in FIG. 1 is an example of one suitable operating environment. Among other components not shown, operating environment 100 includes a number of user devices, such as user devices 102a and 102b through 102n, network 104, and server(s) 108. Each of the components shown in FIG. 1 may be implemented via any type of computing device, such as one or more of computing device 1000 described in connection to FIG. 10, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 10. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out identifying or providing auto-complete image suggestions. In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 110 can facilitate identifying auto-complete image suggestions for a user image using final edit settings associated with images deemed similar to the user image. In embodiments, adaptive-histogram descriptors representing images can be compared to identify images deemed similar to the user image and thereby used to generate auto-complete image suggestions. An auto-complete image suggestion refers to an image suggestion having a set of edits applied, or to apply, to a user image. As described, a user image refers to an image input, selected, and/or being viewed or edited by a user. In this regard, the auto-complete image suggestion includes a rendition of the user image having supplemental edits applied intended to automatically complete image editing for a user.

In operation, a user can select or input an image or picture for which editing is desired. For instance, a user may select a desired image from a repository, for example, stored in a data store accessible by a network or stored locally at the user device 102a. As another example, a user may take a picture using a camera on a device, for example, user device 102a, for which a editing or image correction is desired. Although described as a user selecting an image, an image may be automatically selected. Further, auto-complete image suggestions may be provided for images for which editing is not necessarily desired. For example, a user viewing an image may be presented with auto-complete image suggestions even if the user did not initially intend or desire to edit the image.

Based on the user image, a set of one or more auto-complete image suggestions can be identified and presented to a user. In this regard, identified image edits can be applied to a user image to render an automatically adjusted image suggestion. The auto-complete image suggestions(s) can be displayed via a display screen of the user device. Auto-complete image suggestions can be presented in any manner. As one example, auto-complete image suggestions can be represented via thumbnails.

As described herein, server 108 can facilitate identifying auto-complete image suggestions via image editing engine 106. Server 108 includes one or more processors, and one or more computer-readable media. The computer-readable media includes computer-readable instructions executable by the one or more processors. The instructions may optionally implement one or more components of image editing engine 106, described in additional detail below with respect to image editing engine 202 of FIG. 2. At a high level, image editing engine 106 generates an image-editing index that includes associations of image states and image representations (e.g., adaptive-histogram descriptors) associated with pre-edited images, for example pre-edited by a professional editor. The image-editing index can then be used to identify edit settings to apply to a user image to generate an auto-complete image suggestion. Such an auto-complete image suggestion can be presented to a user to show the user how the user image can be edited in an automated manner.

For cloud-based implementations, the instructions on server 108 may implement one or more components of image editing engine 106, and application 110 may be utilized by a user to interface with the functionality implemented on server(s) 108. In some cases, application 110 comprises a web browser. In other cases, server 108 may not be required. For example, the components of image editing engine 106 may be implemented completely on a user device, such as user device 102a. In this case, image editing engine 106 may be embodied at least partially by the instructions corresponding to application 110.

Thus, it should be appreciated that image editing engine 106 may be provided via multiple devices arranged in a distributed environment that collectively provide the functionality described herein. Additionally, other components not shown may also be included within the distributed environment. In addition, or instead, image editing engine 106 can be integrated, at least partially, into a user device, such as user device 102a. Furthermore, image editing engine 106 may at least partially be embodied as a cloud computing service.

Figure 2:
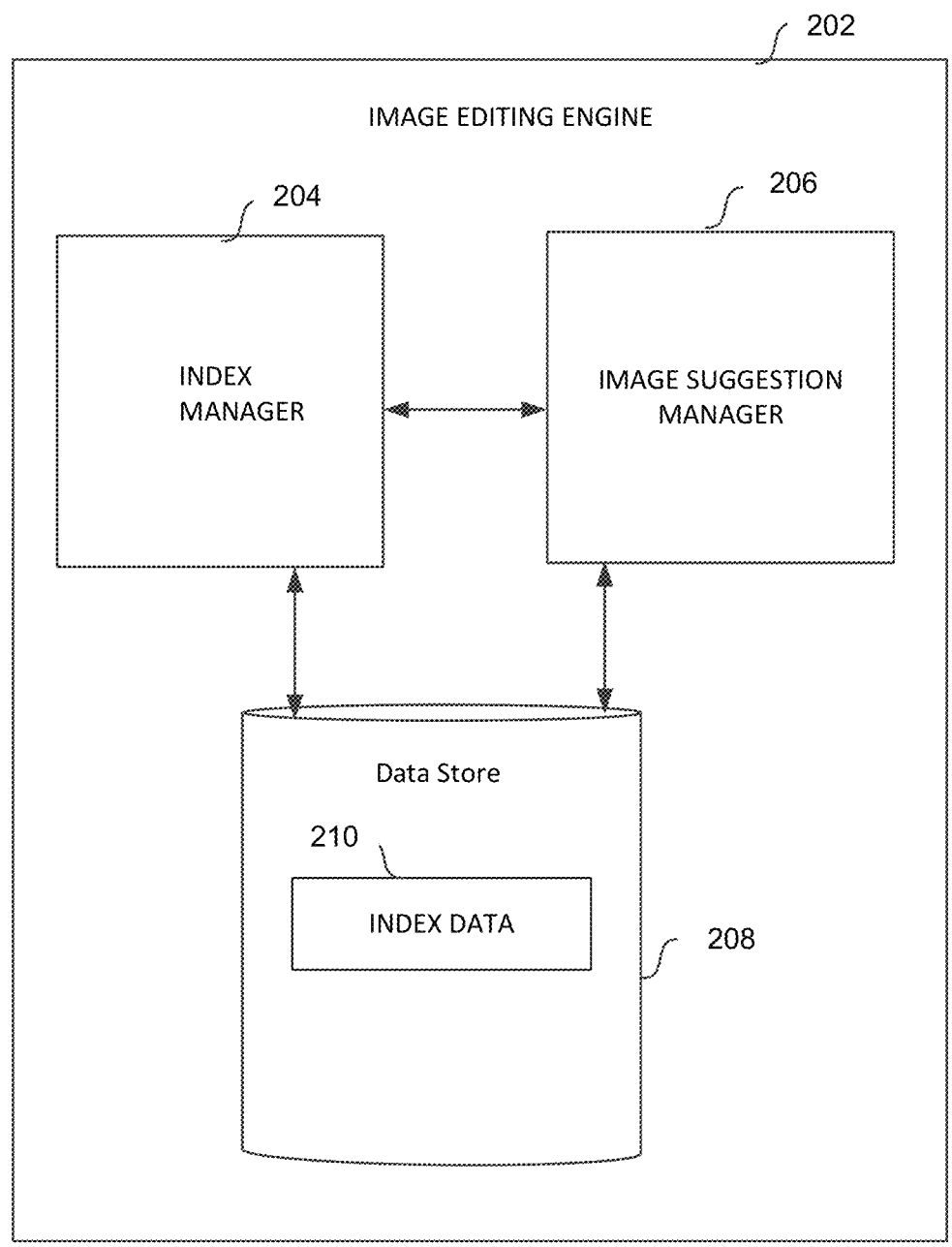
FIG. 2 depicts an example configuration of an operating environment in which some implementations of the present disclosure can be employed, in accordance with various embodiments of the present disclosure.

Referring to FIG. 2, aspects of an illustrative image editing system are shown, in accordance with various embodiments of the present disclosure. Image editing engine 202 includes index manager 204, image suggestion manager 206, and data store 208. The foregoing components of image editing engine 202 can be implemented, for example, in operating environment 100 of FIG. 1. In particular, those components may be integrated into any suitable combination of user devices 102a and 102b through 102n, and/or server (s) 108.

Data store 208 can store computer instructions (e.g., software program instructions, routines, or services), data, and/or models used in embodiments described herein. In some implementations, data store 208 stores information or data received or generated via the various components of image editing engine 202 and provides the various components with access to that information or data, as needed. Although depicted as a single component, data store 208 may be embodied as one or more data stores. Further, the information in data store 208 may be distributed in any suitable manner across one or more data stores for storage (which may be hosted externally).

In embodiments, data stored in data store 208 includes image data 210. Image data generally refers to data used to identify or generate auto-complete image suggestions. As such, image data 210 can include pre-edited images, unique keys, edit states, edit settings, image identifiers, image representations, and the like. In this regard, data store 208 can be used to store an index(s) (e.g., image-editing index) including various types of image data as described in more detail below. In some cases, image editing engine 202 can receive data from user devices (e.g., a user image received by user device 102a or another device associated with a user or editor, via, for example, application 110). In other cases, data can be received from one or more data stores in the cloud.

The index manager 204 can be used to generate and manage an image-editing index. An image-editing index, as used herein, generally refers to an index or dictionary having entries related to image editing. In embodiments described herein, index entries associate image edits (e.g., via edit states) with image representations (e.g., via histogram descriptors). Upon generating an image-editing index, the image-editing index can be used to identify suitable auto-complete suggestions for a given image (user image). To this end, given an image and the corresponding current edit settings, the index can be used to identify edit settings that are suited to be applied to the user image.

In embodiments, the index manager 204 can generate index entries for various edited images. An index entry generally refers to an entry or definition provided in an index that includes associated or correlated data. Index entries may be generated for images that have already been edited (pre-edited images). As can be appreciated, in some embodiments, edited images from which index entries are generated may be professionally edited images (e.g., edited via an image editing professional). As one example, images from a large data set of professionally edited photos may be accessed available in form of tutorials and discover content (e.g., in Adobe® Lightroom®). The edited images may be acquired from any number or type of sources (including the user and/or third-parties) and in any number of ways.

In some embodiments, index entries may be generated in association with edit states of images. As such, an image-editing index may include multiple index entries associated with a particular image having varying editing settings. For example, one index entry may be associated with a first editing state of an image (e.g., a first set of edits applied to an image at a first time) and another index entry may be associated with a second editing state of an image (e.g., a second set of edits applied to an image at a second time).

To generate an index entry, the index manager 204 can obtain an image and corresponding edit settings. An edited image from which an index entry is generated may be in any format. As one example, an original, raw image format may be used. As another example, a preview image format may be used (smaller sized version of the image). As images can be large, a preview image format (e.g., smart image) can enable faster computation without reducing accuracy.

As previously described, an edit setting refers to a value or setting associated with a particular edit control. An edit setting may indicate an extent to which a particular edit control has been applied to an image. An edit control refers to an attribute or aspect of an image that can be edited or adjusted. By way of example only, edit controls may be, or include, exposure, contrast, highlight, transparency, vignette, dehaze, etc.

Edit settings for an edited image may be obtained in association with obtaining the image, e.g., via a data set of professionally edited images, or obtained based on a determination of edit settings. For example, the index manager 204 may obtain an image and corresponding edit settings from a data store, such as data store 208. Edit settings may be stored, for example, in the form of an XMP (Extensible Metadata Platform) or XML (Extensible Markup Language) file. As can be appreciated, in some cases, the index manager 204 may obtain an image and determine or derive the corresponding edit setting(s) based on analysis of the image (e.g., performed by the index manager 204 or other component).

Upon obtaining the images and/or edit settings, the images and/or edit settings can be used to generate index entries associated with the corresponding images. In embodiments, each index entry in an image-editing index may include a unique key and an image representation. A unique key generally refers to a representation of an edit state for a given image. An edit state includes an indication of a set of edit settings for an image at a particular time. As such, a unique key can be generated using editing settings associated with the image for which the unique key is being generated. In this way, a unique key may include an indication of an image (e.g., image identifier) and an edit state, that is, an indication of edit settings for the image at a particular time.

In some cases, an edit state may include the various edit settings or values associated with the image. In such cases, an edit state includes settings that indicate extents to which particular edit controls have been applied to an image. In other cases, an edit state may include various edit application indicators associated with the corresponding edit settings. An edit application indicator refers to an indication of whether an edit associated with an edit control has been applied. Stated differently, an edit application indicator indicates whether a particular edit control has been applied to an image. For example, an edit application indicator may be binary in that a 0 represents that a particular edit control has not been applied to an image, and a 1 represents that the particular edit control has been applied to an image. An edit application indicator can be determined using the corresponding edit settings. For example, when an edit setting associated with an edit control has a non-zero or non-default value, the edit application indicator can indicate (e.g., via a "1") that an edit associated with that particular edit control has been applied to the image.

Figure 3:
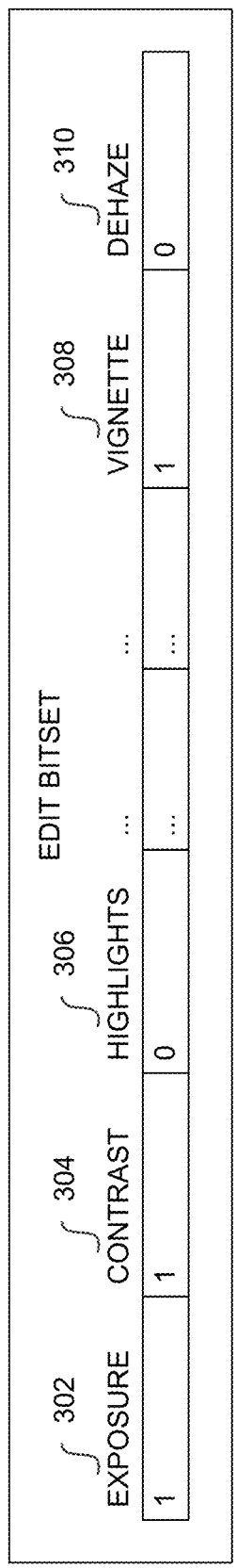
FIG. 3 illustrates one example of an edit state vector, in accordance with embodiments of the present invention.

As described, in some cases, a unique key representing a unique edit state ($X_i$) for a particular given image is generated based on whether particular edit controls have been applied to the image. In some cases, the edit state can be defined as a bit-vector of edit controls, for example, represented as size M, where M is the total number of edit controls. A bit in an edit-state vector $X_i$ may indicate whether a particular edit control has been applied on the image or not (e.g., 1 if applied to the image, 0 if not applied to the image). One example of an edit-state vector is illustrated in FIG. 3. As illustrated, various edit controls are shown, including exposure 302, contrast 304, highlights 306, vignette 308, and dehaze 310. For each edit control, an indication of whether the edit control is applied to the image is denoted by a 0 or a 1.

Each index entry may also include an image representation. The image representation for the image can represent the image having the corresponding edit state. One approach for generating an image representation includes using an adaptive-histogram descriptor to define the image representation. Such an adaptive-histogram descriptor can be used to measure similarity between the user image and images represented in the image-editing index, as described in more detail below.

A histogram descriptor generally refers to a description of a histogram, or distribution of numerical data, related to an image. In embodiments described herein, the histogram descriptor may describe a color distribution of an image. An adaptive-histogram descriptor refers to a description of a histogram representing a distribution of a feature (e.g., colors) for various pa ions or portions of an image. [FK(1] As such, an adaptive-histogram descriptor adapts to or corresponds with various portions of an image. In this regard, an adaptive-histogram descriptor can describe a feature(s) (e.g., color) distribution in association with various portions of an image.

To generate an adaptive-histogram descriptor for an image, histogram descriptors are determined for various portions or sections of an image. To this end, for any given edit state $X_i$ for an image i, an adaptive-histogram descriptor ($H_i$) is determined by dividing an image into sections (e.g., n*n sections). As such, an image can initially be divided or partitioned into multiple portions. As can be appreciated, the number of sections or portions into which the image is divided may be any number. As one example, an image may be divided into 9 portions.

For each image portion, a histogram descriptor is determined. A histogram descriptor may be determined in any of a number of ways. In some cases, a histogram descriptor for an image portion is determined by converting the image portion into HSV (Hue, Saturation, Value) color space. Upon converting the image portion into HSV color space, the histogram descriptor can be determined and normalized (e.g., between 0 and 1).

The histogram descriptors (e.g., normalized histogram descriptors) corresponding with image partitions can be aggregated to form an adaptive histogram descriptor, or image representation. An image representation may be in the form of a vector, which may be referred to herein as a histogram-descriptor vector $H_i$. In accordance with determining a histogram descriptor for an image partition, the normalized histogram descriptor may be appended into the histogram-descriptor vector Hi. Examples of histogram-descriptor vectors $H_i$ are provided in FIG. 4. For example, histogram-descriptor vector 402 is shown, wherein each component 404, 406, 408, 410, and 412 represent histogram descriptors for different partitions of image 420.

Utilizing an adaptive-histogram based descriptor (a set of histograms corresponding with various partitions of an image), as opposed to a histogram representing the entire image, enables capturing of spatial or localized color information of the image. By way of example only, assume an image has two colors with red at the top and green at the bottom of the image. Also assume another image has the same two colors, but with green at the top image and red at the bottom of the image. In this example, histograms computed for both of the images would be generally the same. Utilizing the adaptive-histogram descriptor approach (dividing the image into partitions and determining histograms for each partition), however, results in the two different representations of the image.

To generate a more robust image-editing index, index entries can be generated for other possible edit states for an image. As such, in addition to the image-editing index including an image and a current state of edits applied to the image (e.g., by a professional editor), the image-editing index can include other (e.g., all) possible edit states for that image. The determined possible edit states can be used as unique keys for each index entry.

Possible edit states can be determined in various ways. In one embodiment, upon obtaining or identifying an edit state for an edited image (e.g., a professionally edited image), other possible variations of edit states for the edited image can be determined. By way of example only, assume an edited image has a corresponding edit state of 1,1 indicating that edits of exposure and contrast, respectively, were applied to the image. In such a case, other possible edit states include 0,0; 0,1; and 1,0. As such, for an image, index entries can be created for each of the additional possible edit states. For instance, a first index entry may include a unique key indicating Image A as having edit state of 1,1. A second index entry may include a unique key indicating Image A as having edit state of 0,0. A third index entry may include a unique key indicating Image A as having edit state of 1,0. A fourth index entry may include a unique key indicating Image A as having edit state of 0,1.

As can be appreciated, in some cases, the identified possible variations of edit states may correspond with the particular edit controls altered in the edited image. In this regard, edit state variations may alter the edit application indicators for only those edit controls that were edited (e.g., by a professional editor). To do so, a vector representation, or bit vector, including indications of whether particular edit controls have been applied to an edited image can be analyzed or reviewed. Possible variations of edit states can be automatically generated based on those edit controls that have been applied to the edited image. As such, each potential intermediate edit state leading to the final edited state can be determined. Generating edit state variations based on edits made to an image enables index entries to include intermediate edit states that may have been used by an image editor to arrive at the final edited image. By way of example, assume that five edit controls may be used to edit an image (e.g., exposure, contrast, highlights, vignette, and dehaze). Further assume that for a particular edited image, only the exposure and contrast were edited by an editor. In such a case, the possible variations of edit states to identify include only the possible variations related to the exposure and contrast edit controls.

In accordance with identifying the possible variation of edit states for an image, corresponding image representations (e.g., adaptive-histogram descriptors) can be determined. To this end, a particular edit state variation can be applied to an image and used to determine an image representation for the image having the varied edit state. Image renditions (e.g., in the form of thumbnails) can be generated or computed using edit settings associated with the various edit state variations.

Generating new index entries for possible edit state variations may occur for each edited image. FIG. 4 provides an example of index entries of an image-editing index 400. By way of example, as shown in FIG. 4, unique keys 430 and adaptive-histogram descriptors 432 are shown for a set of images 440. The unique keys 430 each include an image identifier 434 and an edit state 436. As described, each image in the image-editing index 400 may have multiple edit states. As such, each image edit state includes a corresponding adaptive-histogram descriptor. For example, image A 420 having one edit state 422 has one corresponding adaptive-histogram descriptor 424, while the same image A 426 having another edit state 428 has another corresponding adaptive-histogram descriptor 434.

Turning now to the image suggestion manager 206, the image suggestion manager 206 generally manages image suggestions also referred to as auto-complete image suggestions. In particular, the image suggestion manager 206 can generate an image suggestion(s) for a particular input or user image. An image for which an image suggestion(s) is generated can be obtained in any of a number of ways. For example, a user may select or upload a particular image (e.g., to edit). In embodiments, the image suggestion manager 206 can generate image suggestions for an initial image and/or as an image is being edited. Generating image suggestions for an image being edited can be performed dynamically. That is, as an edit is made to an image, the image suggestion manager 206 can facilitate generation of any image suggestions relevant to the current state of the edited imaged.

To facilitate generation of an image suggestion(s) for a particular image (e.g., selected or input by a user), a similar image(s) referenced in the image-editing index can be identified. By identifying similar images in the image-editing index, edits (e.g., final edits) applied to such similar images can be identified and applied to the current image to generate an image suggestion.

Images may be deemed as similar based on any number of attributes. For example, images may be deemed similar based on a similarity of color between a current user image and an image in the image-editing index. In embodiments, to determine similar images in an image-editing index, histogram descriptors (e.g., adaptive-histogram descriptors) can be compared. For example, a distance metric can be used to compare similarity of adaptive-histogram descriptors.

Generally, to compare a user image with images referenced in an image-editing index, an edit state and an image representation (e.g., adaptive-histogram descriptor) can be determined for the user image. Determining an edit state and an image representation (e.g., adaptive-histogram descriptor) can be determined and/or designated in any number of ways, some of which are described above. For example, an edit state may be a vector including indications of whether edits for particular edit controls have been made in association with an image. As another example, an image representation may be a vector including histogram descriptors associated with each of a number of portions of an image.

The edit state of the user image can be used as a key to determine a set of index entries in the image-editing index that have the same, or substantially similar, edit state. For example, in cases that a user image has an edit state of <0,1,0,1>, entries in the image-editing index that also have an edit state of <0,1,0,1> can be identified.

For identified image entries having the same or similar edit state ($X_u$), the corresponding image representation (e.g., adaptive-histogram descriptor) can be compared to the image representation (e.g., adaptive-histogram descriptor) of the user image. In this regard, the similarity or distance between an adaptive-histogram descriptor of a user image and the adaptive-histogram descriptor of an image entry in the image-editing index having the same edit state can be determined.

A distance metric may be used to determine similarity between two image renditions represented as histogram descriptors (e.g., adaptive-histogram descriptors), for example, between the user image and an image represented in an image-editing index having a same or similar edit state as the user image. A distance metric may be a metric used to measure distance. For example, a distance metric may be chi-squared, bhattacharyya, correlation, or histogram intersection. In some cases, a particular distance metric may be predetermined and used to measure distance between image representations. In other cases, a distance metric used to measure distance between image representations may be dynamically determined (for example, based on a type of image or an edit state of an image).

The distance or indication of similarity can be used to determine which of the images or image entries in the index having a same or similar edit state as the user image are a candidate(s) for use in generating an image suggestion(s) for the input user image. In some cases, a set of images or image entries associated with similarity distances that exceeds, or is within, a threshold may be selected as candidate images. In other cases, a set of images or image entries having similarity distances that are the greatest or least may be selected as candidate images. Aspects for determining similarity, such as a threshold value, may be configurable. As used herein, a candidate image (or image entry) is an image (or image entry) that can be used to generate an image suggestion, or auto-complete image suggestion. Generally, as described herein, such candidate images are selected from an image-editing index that are identified as similar to the user image.

For the identified candidate images, final edit settings can be obtained for use in generating image suggestions. Final edit settings for an image generally refer to the editing settings applied to the pre-edited image. As described above, one example of the edited images selected for indexing include images professionally edited. In such cases, the final edit settings of an image are the edit settings applied to the image by a professional editor. Final edit settings can be obtained in any of a number of forms, including but not limited to XMP form. In some cases, the final edit settings for an image may be stored in association with the image-editing index (e.g., an index entry, such as edit state, may indicate whether final applied edits or derived edits). In other cases, the final edit settings for an image may be stored in association with the image or otherwise stored separate from the image-editing index.

The final edit settings can then be used to identify suitable edits to apply to the user image, or representation thereof, to arrive at an image suggestion. In some cases, the final edit settings can be identified as edit settings to apply to the user image. In other cases, the final edit settings associated with a candidate image can be used to identify a suitable set of edits to apply to the input image. As described above, edits applied by a user to a user image are often desired to be maintained. For example, a user may increase exposure of an image and desire to maintain the adjusted exposure. To this end, the edit values of the final edit settings of the pre-edited image (e.g., via the professional editor) may be overridden for the fields associated with edit controls modified by user. Stated differently, final edit settings associated with a candidate image can be overridden with user edit values, where applicable. As such, any applicable user edited settings may replace or override a corresponding setting of the final edit settings to arrive at a set of updated suitable edit settings for use in generating an image suggestion. Thus, the suitable set of edits to apply to the user image may be the user-applied edits and a set of supplemental edits to supplement the user-applied edits. The edit settings identified as suitable to apply to a user image can be added to a list of potential auto-complete edit settings.

As can be appreciated, in some cases, numerous sets of suitable edit settings may be identified, or included in the list of potential auto-complete edit settings. For example, numerous candidate images may be identified as similar to a user image and, as such, final edit settings associated with such candidate images may be used to identify numerous suitable edit settings to apply to the user image. To this end, in some cases, more sets of auto-complete edit settings may exist than are desired to present to a user as image suggestions. Accordingly, in some embodiments, a set of auto-complete edit settings may be selected (e.g., from the list of potential auto-complete edit settings) to generate image suggestions. In one embodiment, auto-complete edit settings, or suitable edit settings, may be selected at least based in part on image diversity such that a user is not provided with image editing suggestions that are too similar to one another.

To achieve diverse image suggestions, in one embodiment, image clustering may be used. To do so, the different sets of auto-complete edit settings can be clustered into different groups or clusters. In particular, sets of auto-complete edit settings having similar styles or edit settings can be grouped together in a same cluster. As one example, k-means clustering may be used, and a vector of normalized slider/control values of each set of auto-complete edit settings can be used as a feature vector. In some cases, a Normalized Manahattan-Distance can be used as the distance metric for clustering. The number of clusters K can be configurable.

Upon clustering the potential auto-complete edit settings, a set of auto-complete edit settings associated with a candidate image can be selected from each cluster, or a portion of the clusters. As one example, a set of auto-complete edit settings may be selected for generating an auto-complete image suggestion based on aesthetics or quality (e.g., with a maximum aesthetics or quality score). Although described as selecting one from each cluster, any number can be selected from any cluster.

The selected sets of auto-complete edit settings can then be applied to the user image to generate corresponding auto-complete image suggestions. An auto-complete image suggestion includes an image (the user image) with edits automatically applied to the user image. As can be appreciated, the automatically applied edits may include edits in addition or supplemental (or variations) to any edits applied by the user.

The auto-complete image suggestion can be presented in any form, including a thumbnail representation. A user may select the thumbnail for a larger view of the auto-complete image suggestion. In some cases, a user may select to implement or apply the edits to the user image. For example, in accordance with viewing a set of auto-complete image suggestions, a user may view one auto-complete image suggestion that is desirable to the user. In such a case, the user may select to apply such edits to the user image.

In operation, and by way of example only, assume a user opens an image and has not yet applied any edits to the image. For the user image, an edit state vector $X_u$ can be determined to be <0,0> representing that no edits related to exposure and contrast have been made to the image. The image may be partitioned and each partition analyzed to generate an image representation in the form of an adaptive-histogram descriptor $H_u$. Using edit state vector $X_u$ as a key, a lookup can be performed via an image-editing index to identify index entries or images also having an edit state represented as <0,0>. That is, the image-editing index is used to identify index entries or images that have a same edit state as the user image. The user image can be compared to the images having a same edit state to identify similar images. As described herein, the user image can be compared to images in the image-editing index having a similar state using the corresponding image representations. As such, the adaptive-histogram descriptors $H_i$ and image-identifiers I can be retrieved or obtained for all entries where the edit state is the same as the user image $X_u$. For each adaptive-histogram descriptor $H_i$, the distance between $H_u$ and $H_i$ can be determined using a defined distance metric. If the distance value is within a threshold (which may be configurable), the corresponding image identifier can be added to a list of candidate image. For each item in the list of candidate images, final edit settings (e.g., in XMP form) can be referenced and the edit values for the fields modified by user can override the corresponding final edit settings to generate sets of suitable edit settings, or sets of potential auto-complete settings. A portion of the sets of potential auto-complete setting may be selected (e.g., via k-means clustering) for use in generating auto-complete image suggestions. The auto-complete image suggestions can be generated using the selected auto-complete settings and presented to a user.

This process can be performed any number of times to adapt to the current edit state of a user image. For example, in some cases, this process may be repeated upon a user making an edit to the user image. In other cases, this process may be repeated upon a user selection to view auto-complete image suggestions (e.g., selection of an icon). In yet other cases, this process may be repeated upon a lapse of a time duration (e.g., every minute). In any case, the auto-complete image suggestions may be dynamically updated to take into account any edits made to an image by a user.

For instance, continuing with the above example, assume a user adjusts the exposure of the user image. In such a case, the edit state vector $X_u$ can be determined to be <1,0> representing that an edit related to exposure has been made to the image. The image may be partitioned and each partition analyzed to generate an image representation in the form of an adaptive-histogram descriptor $H_u$. Using the edit state vector of $X_u$<1,0> as a key, a lookup can be performed via the image-editing index to identify index entries or images also having an edit state represented as <1,0>. The user image can be compared to the images having a same edit state of <1,0> to identify similar images. As described herein, the user image can be compared to images in the image-editing index having a similar state using the corresponding image representations. The process can continue as described above to identify auto-complete image suggestions to present to a user. However, in this continued example, the auto-complete image suggestions generated are based on a different edit state of the image (e.g., <1,0>) thereby resulting in different auto-complete image suggestions being presented to the user.

As can be appreciated, in embodiments, index generation may be, at least in part, be performed in a pre-processing manner while generation of auto-complete suggestion is performed during editing or viewing of the image.

Figure 5A:
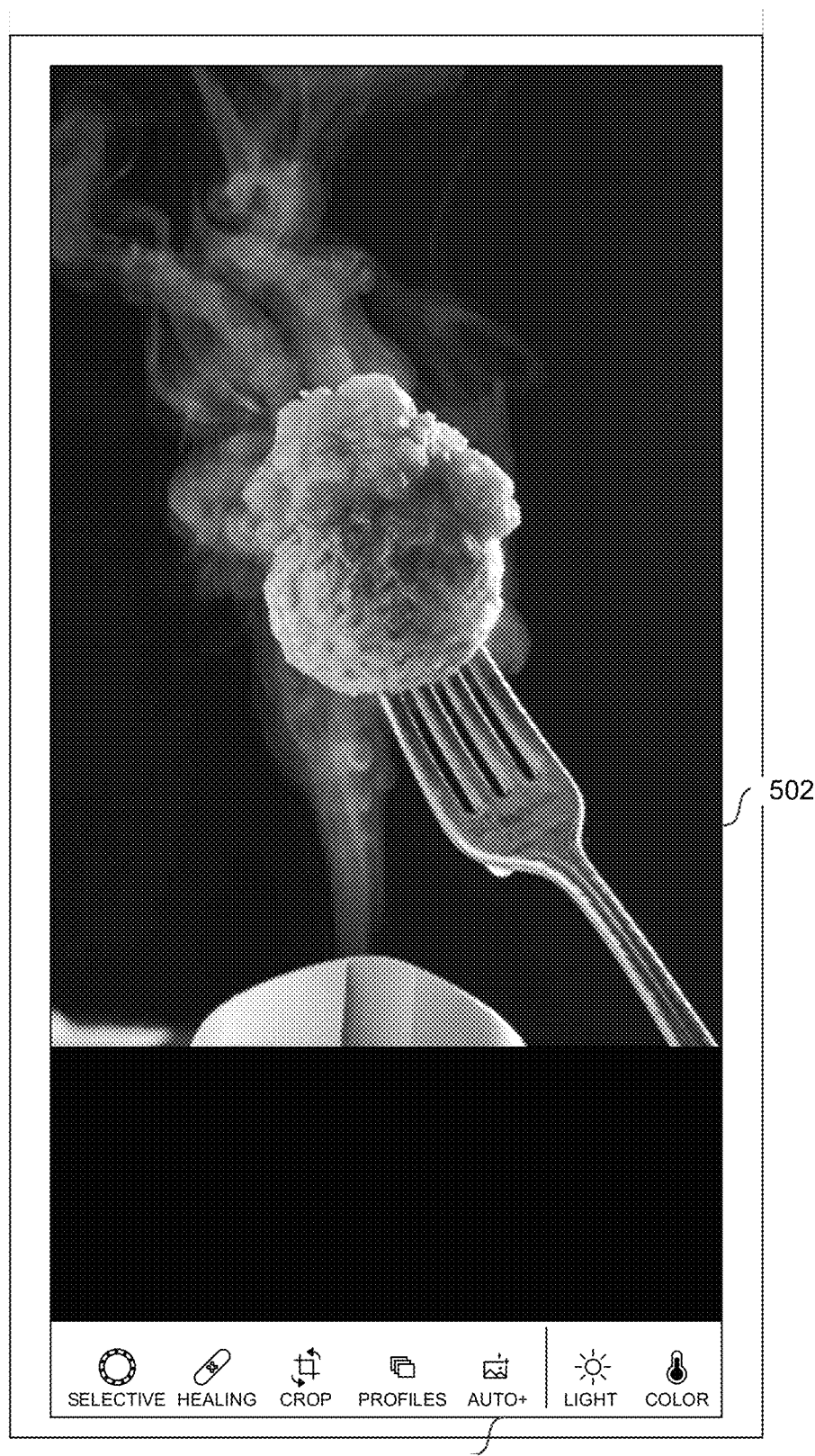
FIGS. 5A-5D provide example user interfaces associated with auto-complete image suggestions, in accordance with embodiments of the present invention.
Figure 5B:
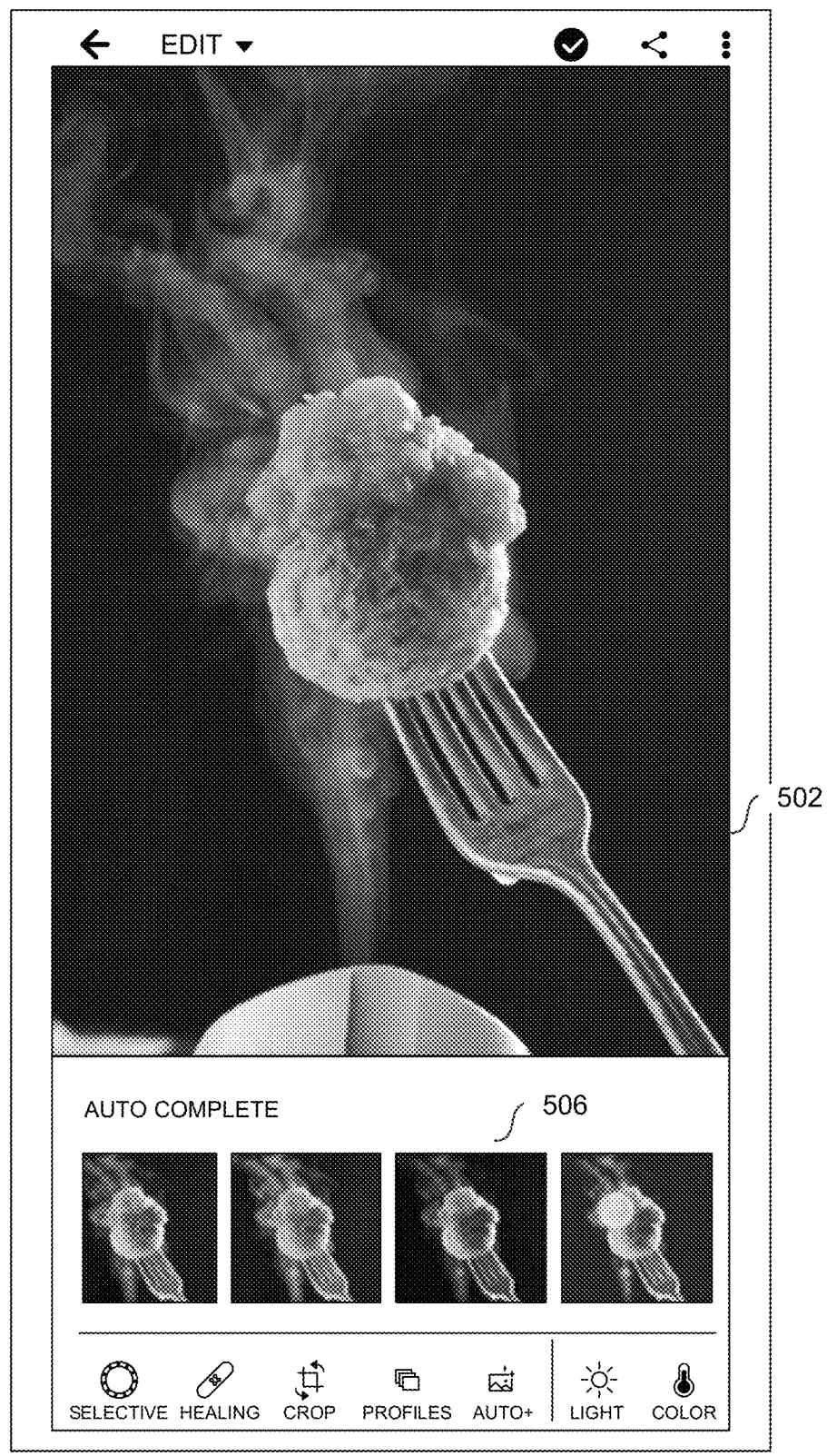
Figure 5C:
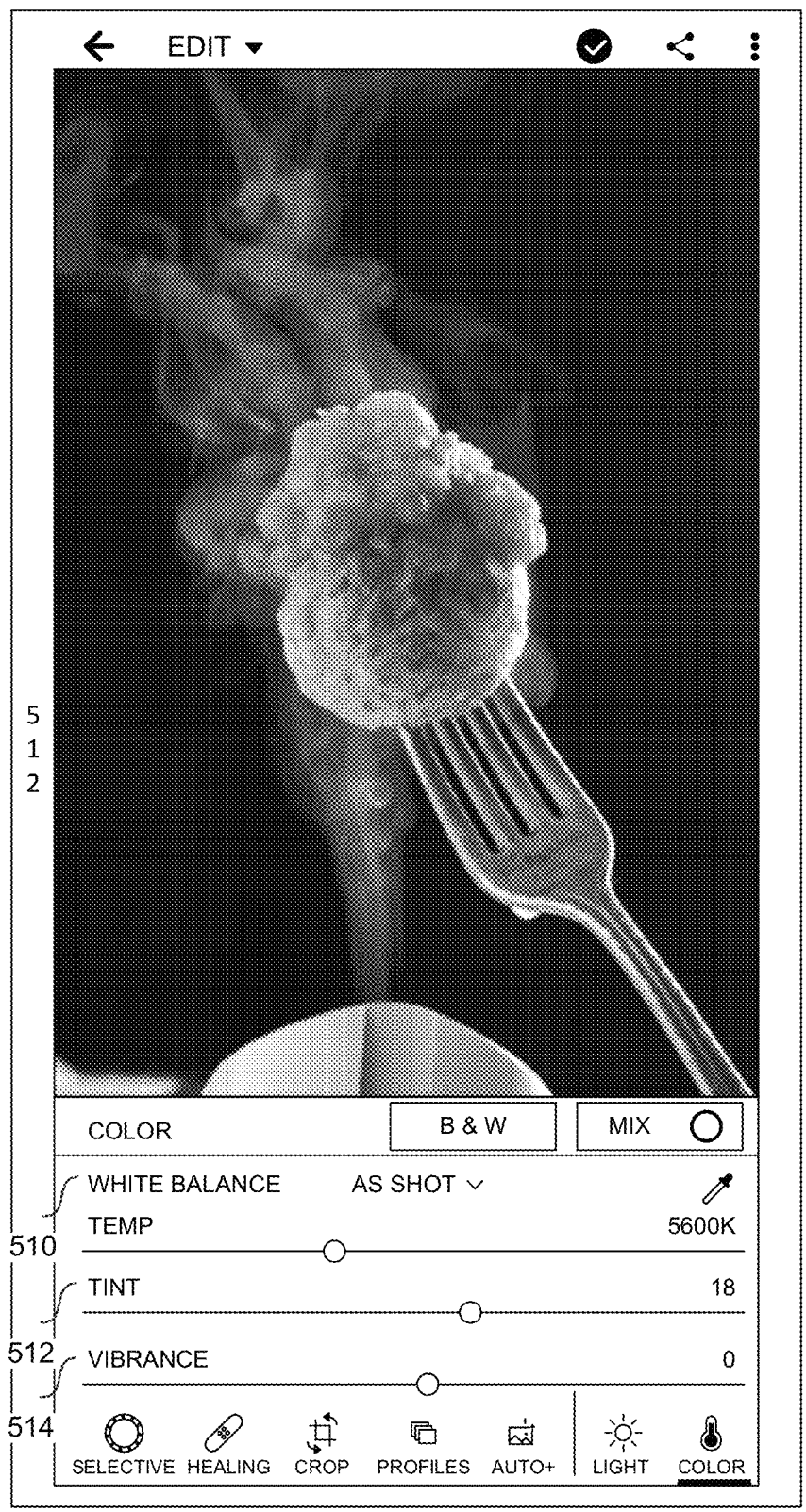
Figure 5D:
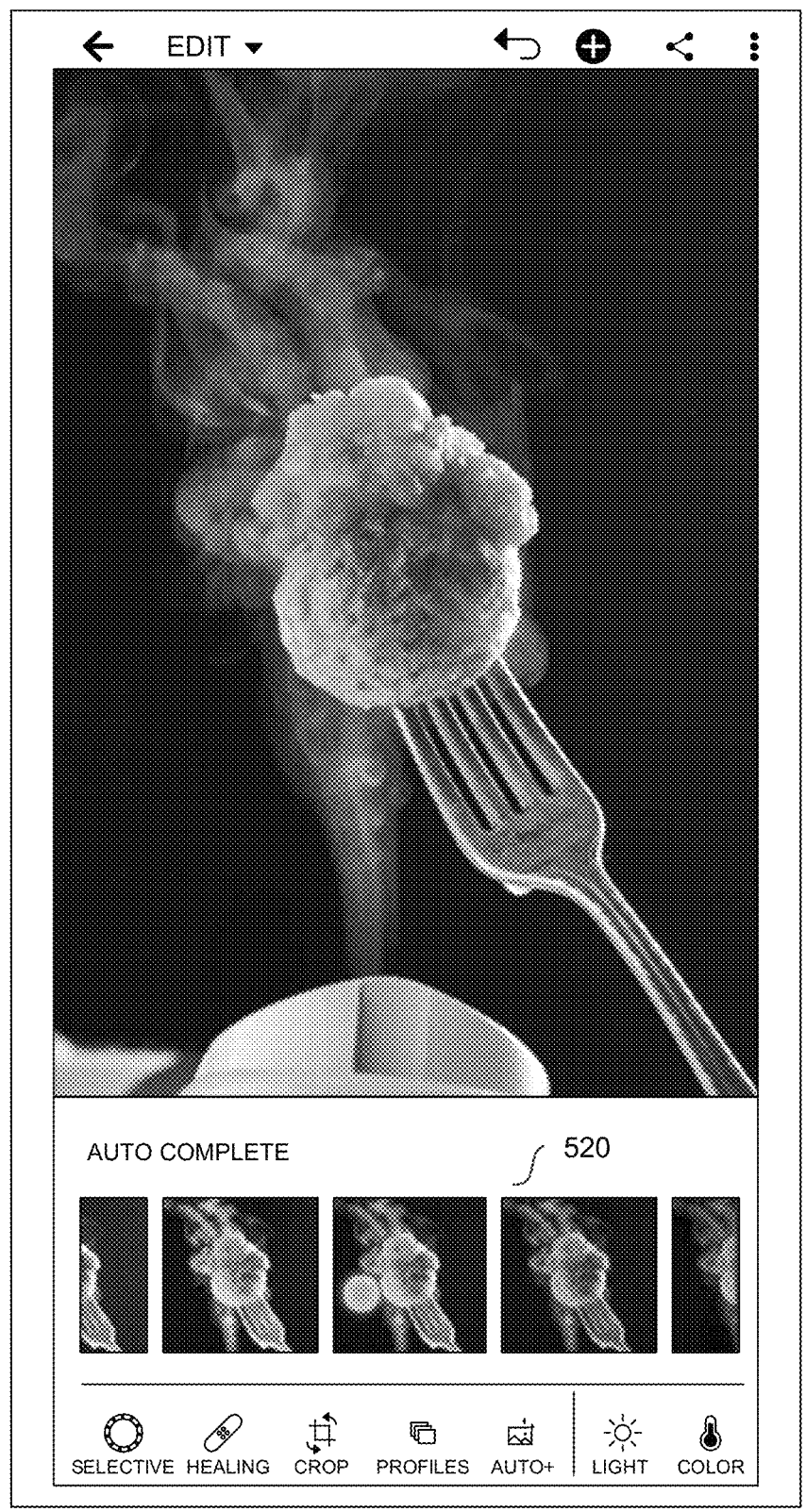

FIGS. 5A-5D provide illustrative screen displays in accordance with embodiments of the present invention. With initial reference to FIG. 5A, an image 502 is presented to a user. Assume that a user desires to view potential edits that can be made to the image to enhance the image. As such, the user can select an auto-complete image suggestion icon 504. Upon selecting the auto-complete image suggestion icon 504, a set of auto-complete image suggestions may be presented. For example, as shown in FIG. 5B, a set of auto-complete image suggestions 506 are presented. As described herein, such auto-complete image suggestions can have various edits that are determined via similar pre-edited images. If selected, the applicable edits can be applied to image 502 to automatically complete a set of edits in connection with the image. Now assume a user wishes to make edits to the image. As shown in FIG. 5C, the user can access various edit settings and manipulate the settings as desired to edit the image. For example, the user may select to modify white balance temp 510, tint 512, or vibrance 514. Assume the user selects to modify the tint 512. In such a case, the image 502 can be adjusted with the modified tint, as in FIG. 5D. Now assume a user selects to view auto-complete image suggestions. In such a case, auto-complete image suggestions 520 are presented to a user. As described, the auto-complete image suggestions 520 take into account the edits input by the user. As such, the auto-complete image suggestions 520 can be different (e.g., different edits) than the auto-complete image suggestions 506 before the user image was edited.

Figure 6:
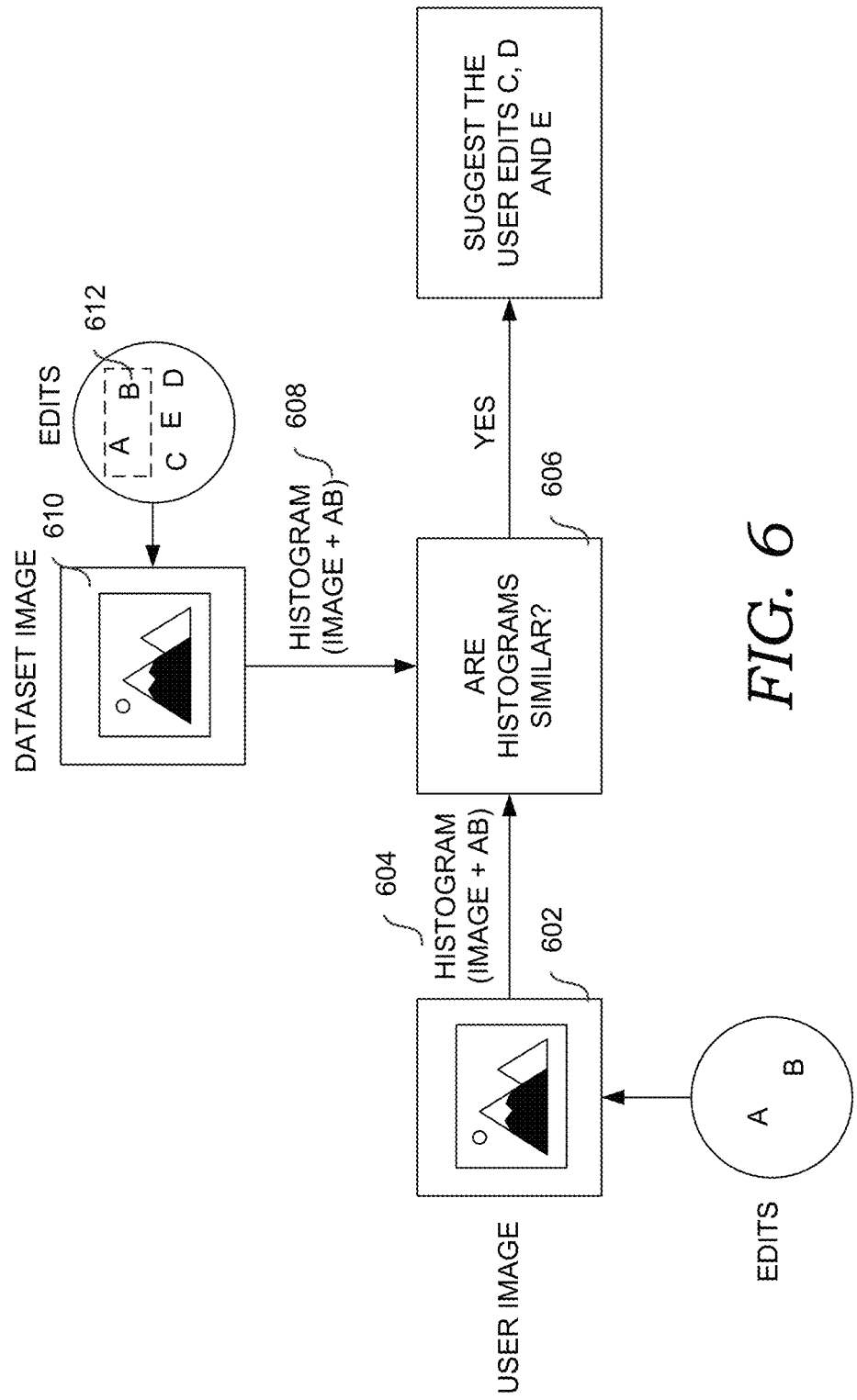
FIG. 6 illustrates one exemplary flow diagram according to embodiments of the present invention.

FIG. 6 illustrates a flow diagram in accordance with embodiments of the present invention. As shown in FIG. 6, assume a user makes edits A and B to the image 602. A histogram descriptor, such as an adaptive-histogram descriptor 604 can be generated via analysis of the image 602. At block 606, a determination can be made as to whether the histogram descriptor 604 is similar to the histogram descriptor 608. The histogram descriptor 608 is generated from the dataset image 610 having the same edits 612 as the edits applied to the image 602 (in this case edits A and B). In accordance with the histogram descriptors 608 and 604 being similar to at least an extent, or threshold, edits identified that can be applied to the user image 602 include edits applied to a final version of the dataset image 610. In this case, edits C, D, and E can be applied to the image 602 for rendering an auto-complete image suggestion.

Figure 7:
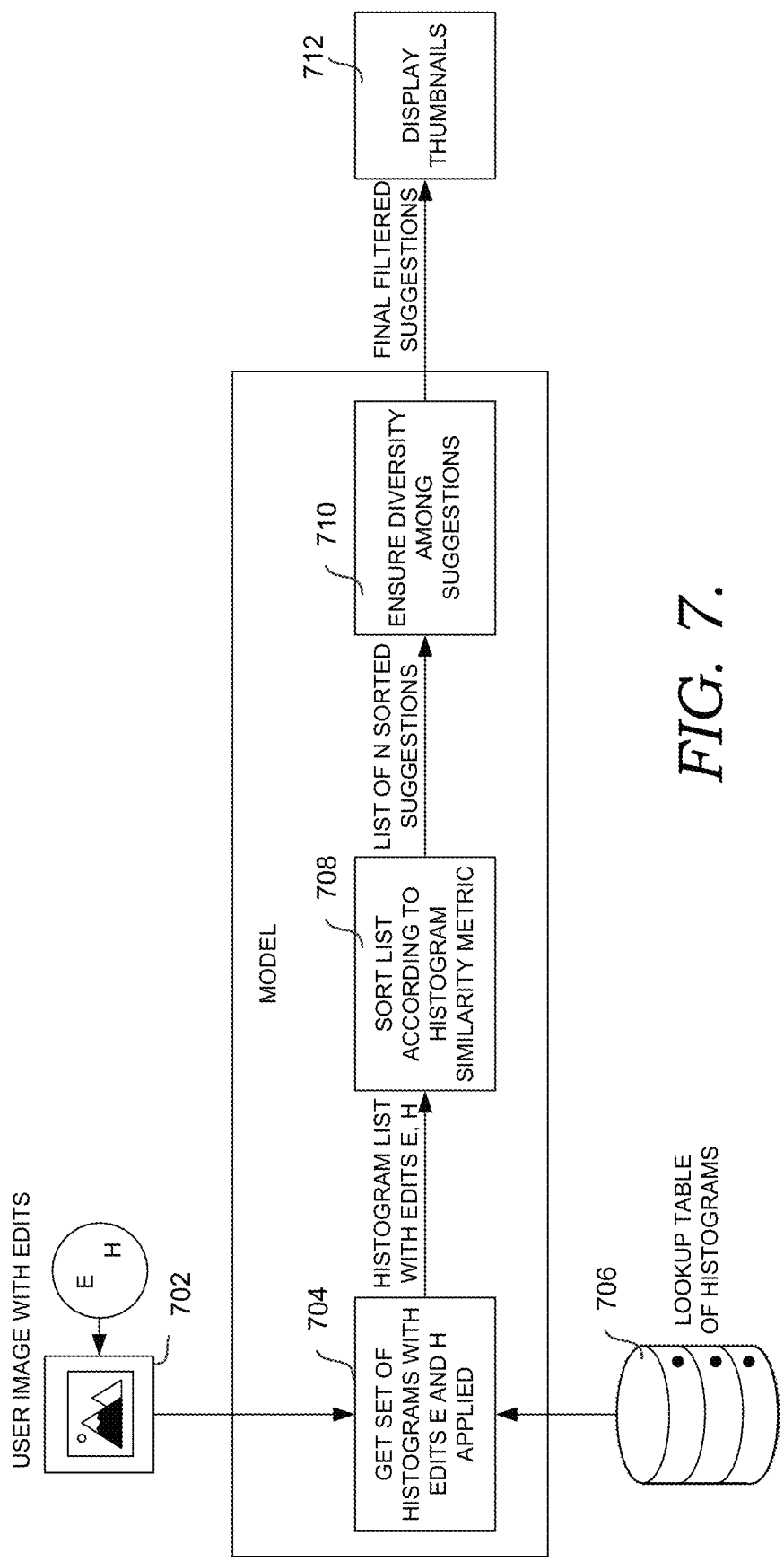
FIG. 7 illustrates another exemplary flow diagram according to embodiments of the present invention.

FIG. 7 illustrates another flow diagram in accordance with embodiments of the present invention. As shown in FIG. 7, assume a user makes edits E and H to the image 702. Based on the edits to the image 702, at block 704, histogram descriptors (e.g., adaptive-histogram descriptors) associated with images having the same edits, edit E and H, can be referenced from a lookup table 706. The similarities between the histogram descriptor associated with user image 702 can be compared to the referenced histogram descriptors and sorted according to the similarity metric, at block 708. At block 710, auto-complete image suggestions can be ensured diversity, for example, via clustering and selection of images associated with the various clusters. At block 712, the final set of auto-complete image suggestions can be presented, for instance, as thumbnails.

Figure 8:
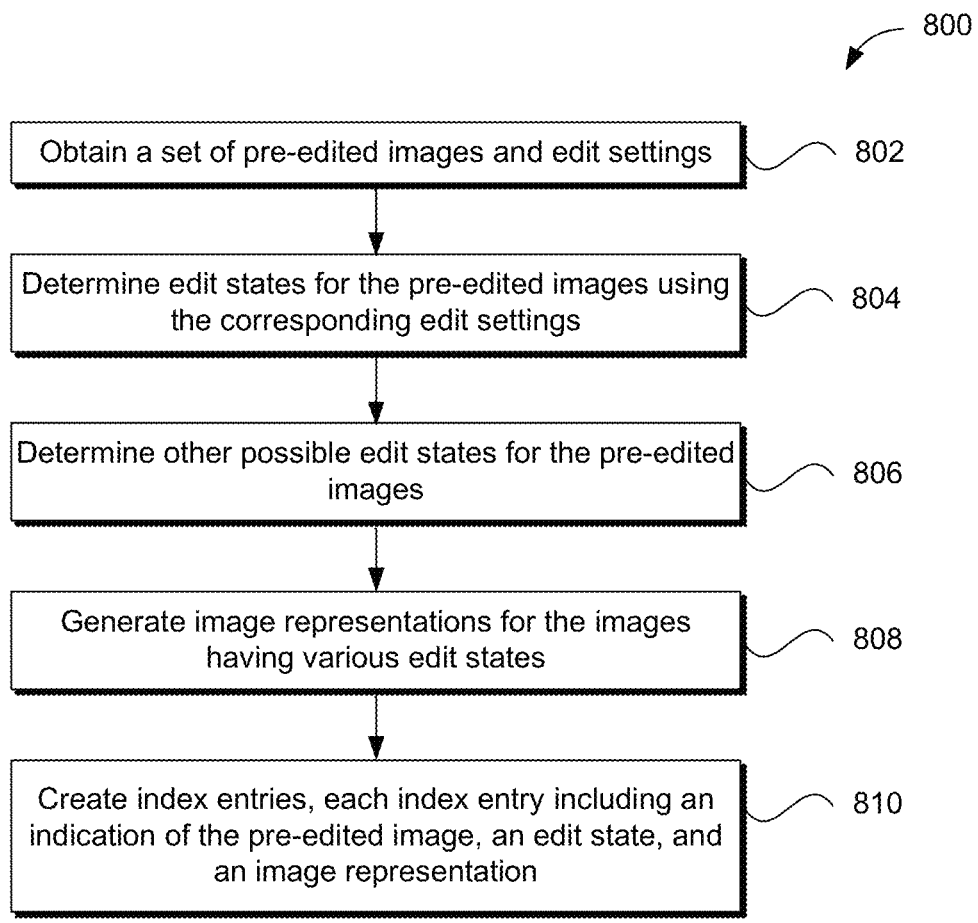
FIG. 8 a process flow showing a method for generating index entries, in accordance with embodiments of the present invention.

With reference to FIG. 8, a process flow is provided showing an embodiment of method 800 for generating index entries, in accordance with embodiments of the present invention. At block 802, a set of pre-edited images and corresponding edit settings can be obtained. At block 804, edit states for the pre-edited images can be determined using the corresponding edit settings. At block 806, other possible edit states for the pre-edited images are determined. At block 808, image representations, such as adaptive-histogram descriptors, are generated. At block 810, index entries are created. Each index entry includes an indication of the pre-edited image, an edit state, and an image representation.

Figure 9:
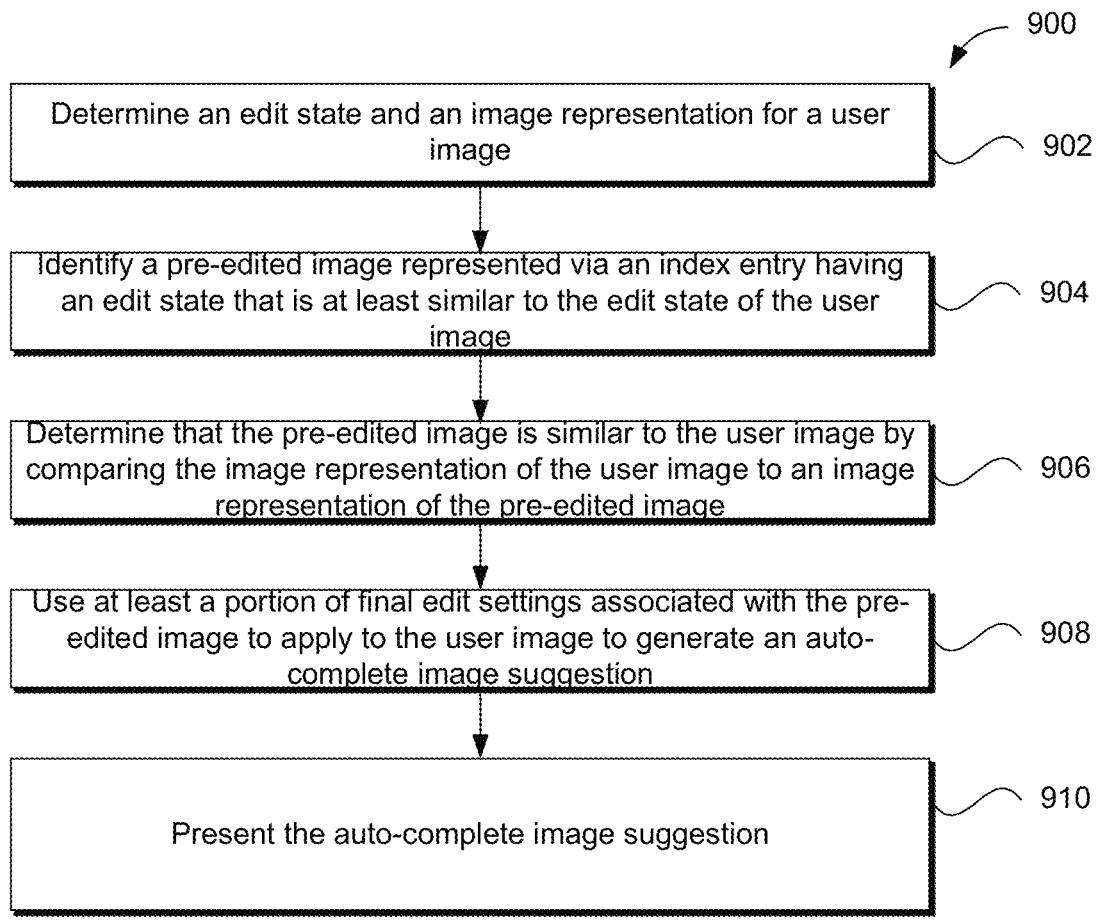
FIG. 9 is a process flow showing a method for generating auto-complete image suggestions, in accordance with embodiments of the present invention.

Turning to FIG. 9, a process flow is provided showing an embodiment 900 for generating auto-complete suggestions. At block 902, an edit state and an image representation are determined for a user image. At block 904, a pre-edited image having an edit state that is similar or the same as the edit state of the user image is identified. At block 906, it is determined that the pre-edited image is similar to the user image by comparing the image representation of the user image to an image representation of the pre-edited image. At block 908, at least a portion of the final edit settings associated with the pre-edited image is sued to apply to the user image to generate an auto-complete image suggestion. The auto-complete image suggestion is presented at block 910.

Figure 10:
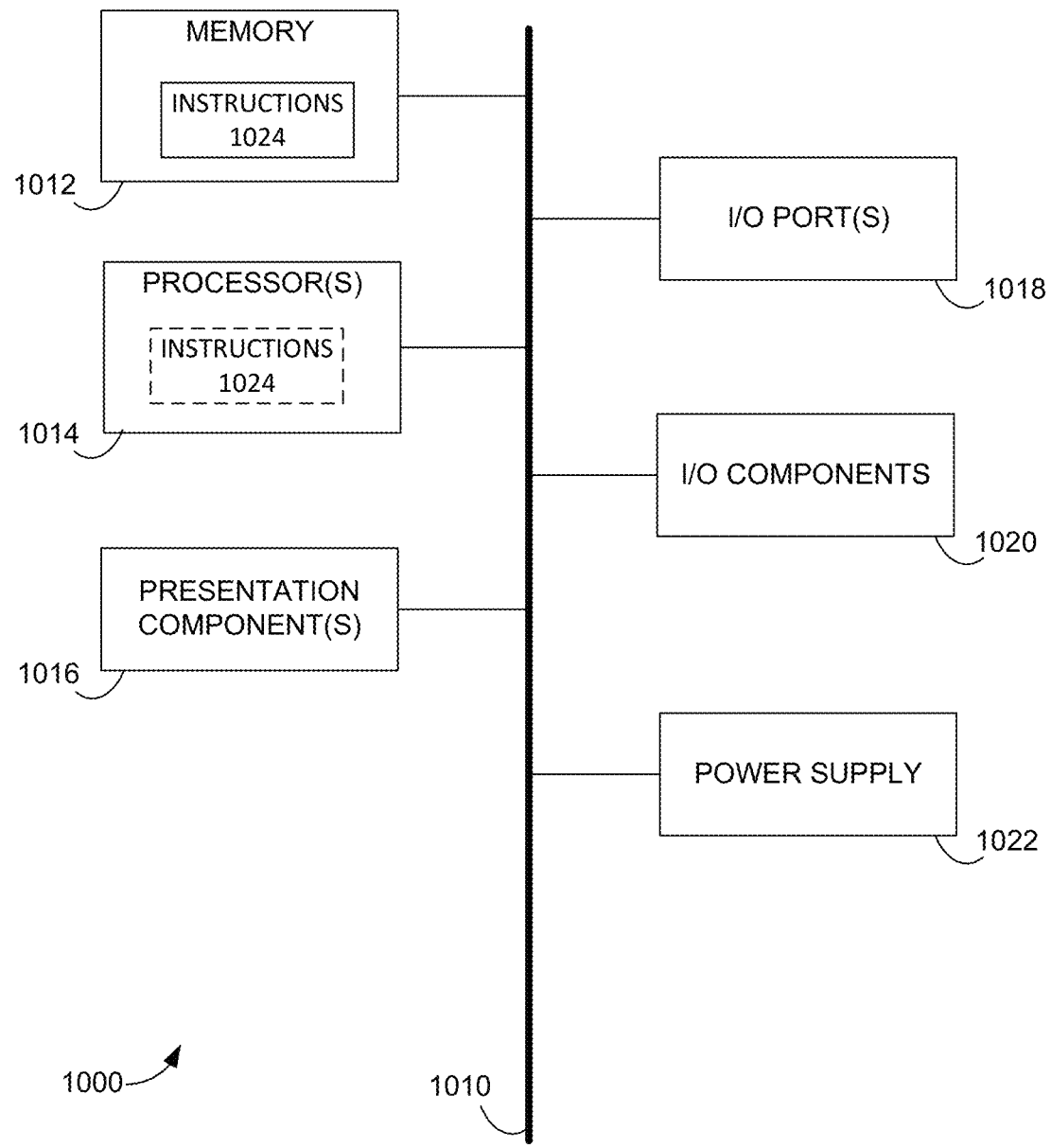
FIG. 10 is a block diagram of an example computing device in which embodiments of the present disclosure may be employed.

Having described embodiments of the present invention, FIG. 10 provides an example of a computing device in which embodiments of the present invention may be employed. Computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 10 is merely illustrative of an exemplary computing device that can be used in connection with one or more embodiments of the present invention. Distinction is not made between such categories as "workstation," "server," "laptop," "handheld device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1012 includes computer storage media in the form of volatile and/or nonvolatile memory. As depicted, memory 1012 includes instructions 1024. Instructions 1024, when executed by processor(s) 1014 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1000. Computing device 1000 may be equipped with depth cameras, such as stereoscopic camera systems, infrared camera systems, RGB camera systems, and combinations of these, for gesture detection and recognition. Additionally, computing device 1000 may be equipped with accelerometers or gyroscopes that enable detection of motion. The output of the accelerometers or gyroscopes may be provided to the display of computing device 1000 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented for generating auto-complete image suggestions, the method comprising:
   obtaining a user image having an edit state, the edit state indicating user-applied edits to the user image;
   generating an auto-complete image suggestion, the auto-complete image suggestion including a representation of the user image with the user-applied edits and a set of supplemental edits, the supplemental edits determined from a pre-edited image represented via a first index entry, of an image-editing index, identified as similar to the user image, wherein the pre-edited image is identified as similar based on a comparison of an adaptive-histogram descriptor representing the pre-edited image to an adaptive-histogram descriptor representing the user image.

2. The computer-implemented method of claim 1, wherein the representation of the user image with the user-applied edits and the set of supplemental edits comprises a thumbnail presented in association with the user image.

3. The computer-implemented method of claim 1, wherein the edit state indicates the user-applied edits via a vector having binary values associated with each of a set of edit controls, each binary value indicating whether the corresponding edit control has been applied to the user image.

4. The computer-implemented method of claim 1 further comprising:
   determining the edit state using a set of edit settings associated with the user image; and
   determining an image representation for the user image.

5. The computer-implemented method of claim 4, wherein the adaptive-histogram descriptor representing the user image is determined by:
   partitioning the user image into a plurality of portions;
   determining a histogram descriptor for each portion of the plurality of portions; and
   aggregating the histogram descriptors to form the adaptive-histogram descriptor.

6. The computer-implemented method of claim 1, wherein the supplemental edits are determined from the pre-edited image identified as similar to the user image by:
   identifying an image entry associated with the pre-edited image having a same or substantially similar edit state as the edit state of the user image;
   determining that an image representation associated with the pre-edited image is similar to an image representation of the user image; and
   identifying a set of final edit settings associated with the pre-edited image.

7. The computer-implemented method of claim 6, wherein the pre-edited image is accessed at a data store.

8. One or more computer-readable media having a plurality of executable instructions embodied thereon, which, when executed by one or more processors, cause the one or more processors to perform a method for generating auto-complete image suggestions, the method comprising:
   determining an edit state and an image representation for a user image, the edit state indicating user-applied edits to the user image;
   identifying a pre-edited image represented via a first index entry, of an image-editing index, having an edit state that is at least similar to the edit state of the user image;
   determining that the pre-edited image is similar to the user image by comparing an adaptive-histogram descriptor of the image representation of the user image to an adaptive-histogram descriptor of an image representation of the pre-edited image; and
   using at least a portion of final edit settings associated with the pre-edited image to apply to the user image to generate an auto-complete image suggestion.

9. The media of claim 8, wherein comparing the adaptive-histogram descriptor of the image representation of the user image to the adaptive-histogram descriptor of the image representation of the pre-edited image comprises using a distance metric.

10. The media of claim 9, wherein the adaptive-histogram descriptor for the user image generated by:
    partitioning the user image into a plurality of portions;
    determining a histogram descriptor for each portion of the plurality of portions; and
    aggregating the histogram descriptors to form the adaptive-histogram descriptor for the user image.

11. The media of claim 8 further comprising using the user-applied edits with the at least the portion of final edit settings associated with the pre-edited image to apply to the user image to generate an auto-complete image suggestion.

12. The media of claim 8, wherein each of the edit state of the user image and the edit state of the pre-edited image comprise an indication of edits via a vector having binary values associated with each of a set of edit controls, each binary value indicating whether the corresponding edit control has been applied to the respective image.

13. The media of claim 8, wherein the image-editing index comprises a set of index entries representing a set of pre-edited images, each index entry associating an edit state with an image representation for the corresponding pre-edited image.

14. The media of claim 8 further comprising:
identifying a second pre-edited image represented via a second index entry, of the image-editing index, having an edit state that is at least similar to the edit state of the user image;
determining that the second pre-edited image is similar to the user image by comparing the image representation of the user image to an image representation of the second pre-edited image; and
using at least a portion of final edit settings associated with the second pre-edited image to apply to the user image to generate a second auto-complete image suggestion.

15. The media of claim 14, wherein the first auto-complete image suggestion and the second auto-complete image suggestion are presented concurrently with the user image.

16. A computing system comprising:
one or more processors; and
one or more non-transitory computer-readable storage media, coupled with the one or more processors, having instructions stored thereon, which, when executed by the one or more processors, cause the computing system to provide:
means for generating an image-editing index having a plurality of index entries that each include an edit state of a pre-edited image and an adaptive-histogram descriptor representing the pre-edited image; and
means for generating a first auto-complete image suggestion for a user image, the first auto-complete image suggestion including a representation of the user image with a set of edits applied to the user image, the set of edits determined from a first pre-edited image identified as similar to the user image based on a comparison of the adaptive-histogram descriptor representing the first pre-edited image to an adaptive-histogram descriptor representing the user image.

17. The system of claim 16, wherein an index entry is generated based on a determination of the edit state and the adaptive-histogram descriptor for the pre-edited image.

18. The system of claim 16, wherein the auto-complete image suggestion further includes user-applied edits.

19. The system of claim 16, further comprising:
means for generating a second auto-complete image suggestion for the user image, the second auto-complete image suggestion including a representation of the user image with a set of edits applied to the user image, the set of edits determined from a second pre-edited image identified as similar to the user image based on a comparison of an adaptive-histogram descriptor representing the second pre-edited image to an adaptive-histogram descriptor representing the user image.

20. The system of claim 16 further comprising means for presenting the auto-complete image suggestion concurrently with the user image.

* * * * *